United States Patent [19]

Dickinson et al.

[11] Patent Number: 5,080,250

[45] Date of Patent: Jan. 14, 1992

[54] FLOOR MOUNTED PICKUP TRUCK BOXES

[75] Inventors: Thomas Dickinson, St. Louis, Mo.; Klaus Butz, Huntington Beach, Calif.

[73] Assignee: Contico International, Inc., St. Louis, Mo.

[21] Appl. No.: 614,988

[22] Filed: Nov. 13, 1990

Related U.S. Application Data

[63] Continuation of Ser. No. 195,904, May 19, 1988, abandoned.

[51] Int. Cl.⁵ .............................................. B65D 43/24
[52] U.S. Cl. .................... 220/335; 220/334; 220/342; 220/608; 220/659; 220/675; 224/42.42; 224/273; 296/37.6
[58] Field of Search ............... 220/334, 335, 337, 342, 220/608, 659, 675, 343, 4.22, 4.23; 224/42.42, 273; 296/37.6; D12/157

[56] References Cited

U.S. PATENT DOCUMENTS

| D. 279,664 | 7/1985 | Waters | D12/157 |
|---|---|---|---|
| D. 294,935 | 3/1988 | Grossman | D12/157 |
| 3,326,595 | 6/1967 | Ogilvie | 224/42.42 X |
| 3,406,855 | 10/1968 | McKechnie | 220/72 |
| 3,889,839 | 6/1975 | Butz . | |
| 3,893,615 | 7/1975 | Johnson | 232/43.2 |
| 3,923,196 | 12/1975 | Miller et al. | 220/335 |
| 3,987,829 | 10/1976 | Leone . | |
| 4,005,800 | 2/1977 | Schurman | 220/337 |
| 4,022,345 | 5/1977 | Buttz . | |
| 4,288,011 | 9/1981 | Grossman | 224/42.42 |
| 4,488,669 | 12/1984 | Waters . | |
| 4,549,672 | 10/1985 | Rinkewich | 220/72 |
| 4,674,665 | 6/1987 | Van Kirk | 224/42.42 |
| 4,728,017 | 3/1988 | Mullican | 224/42.42 |
| 4,770,330 | 9/1988 | Bonstead | 224/42.42 |
| 4,967,944 | 11/1990 | Waters | 224/273 |

OTHER PUBLICATIONS

Glearbox—The Total Truck Storage System.
Gott48 Cooler.
Tuff-Box—Contico.

*Primary Examiner*—Stephen Marcus
*Assistant Examiner*—Stephen Cronin
*Attorney, Agent, or Firm*—Sandler, Greenblum & Bernstein

[57] ABSTRACT

A blow molded storage container which is at least 20 inches wide and thirty inches long. The container is blown through an end wall with at least two blow bins. Also the rear section of the door rim is at least twice the width of the front section.

8 Claims, 4 Drawing Sheets

FLOOR MOUNTED PICKUP TRUCK BOXES

This application is a continuation of application Ser. No. 07/195,904, filed May 19, 1988 abandon.

BACKGROUND OF THE INVENTION

I. Field of the Invention

The present invention is directed to large blow molded containers. In particular, the invention is directed to boxes which are designed to be mounted onto the floor bed of pickup trucks.

II. Description of the Prior Art

Due to the availability in the United States in recent years of large blow molding equipment, tool and storage boxes for pickup trucks are being manufactured from plastic. Traditionally these boxes have been manufactured using metal. The plastic boxes are preferred by a substantial portion of the market due to their appearance and strength, especially the fact that they dont't rust.

Pickup truck storage boxes utilize two basic support systems. One system relies upon the side walls of the pick up for support of the box. Such a box is illustrated in U.S. Pat. No. 3,987,829. The end members of the box rest over the top section of the pickup side wall. The box sits above the truck bed. This allows storage of materials beneath the floor of the box.

A second type of box does not hang on the pickup side walls but instead rests directly on the floor of the pickup truck. This box has a single or double door that opens along the length of box. The box is self supported but its floor and side walls.

Blow molded pickup truck storage boxes have suffered a number of deficiencies. Due to the size of these boxes they have taken considerable time to mold. This increased molding cycle adds significantly to the cost of the product. A second problem that is encountered with these boxes is that the sides and doors have a tendency to warp. A third significant character of plastic boxes is that they tend to leak during inclement weather or when passed through car washes.

It is an objective of the present invention to produce a large blow molded storage box which is designed to mount on the floor of a pickup truck. Advantageously the walls and the doors of the box do not exhibit warpage and support the load without bowing. Another objective is to manufacture the box with a reduced molding cycle. Finally it is the object of the invention to design such a box in a manner which precludes water leakage around the door openings.

SUMMARY OF THE INVENTION

A blow molded storage container which is at least 20 inches wide and 30 inches long which comprises a rim around its door openings whose back section upon which a door hinges is at least twice the width of the front section. The invention also involves a method of blow molding rectangular storage containers which are at least 20 inches wide and 30 inches long comprising the blowing. Further, the invention is directed to a double walled door which is at least 20 inches wide and 30 inches long for a blow molded storage container which comprises elongated recessed members on the bottom wall of the door whose length are parallel to the length of the door.

DECRIPTION OF THE PREFERRED EMBODIMENTS

Figure 9:
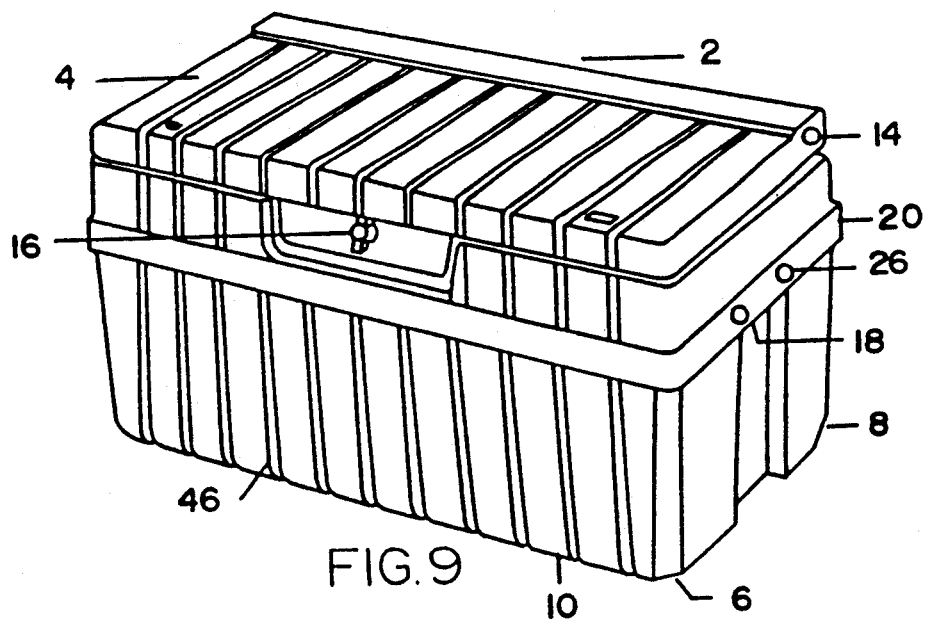
FIG. 9 is another embodiment of the box of the invention.
Figure 10:
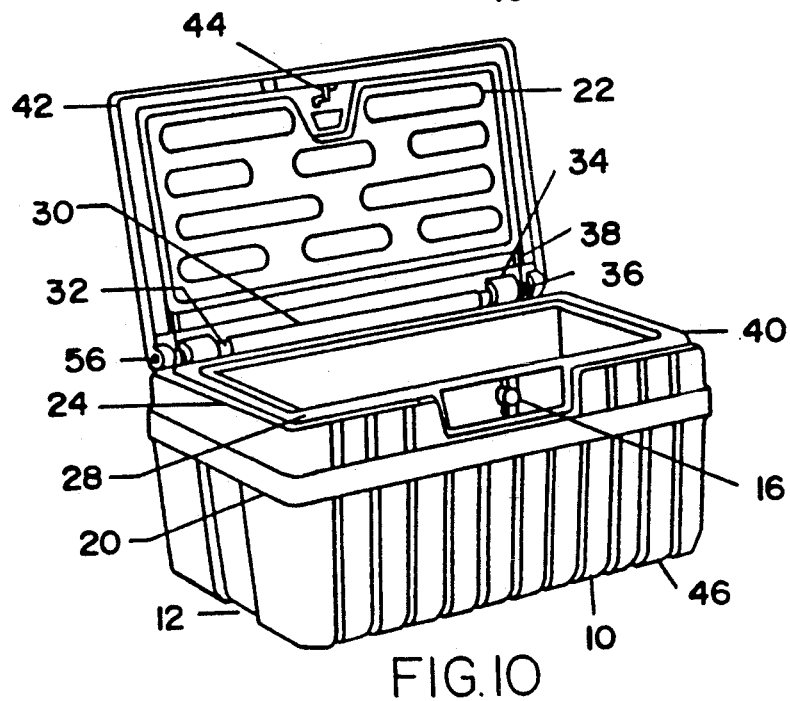
FIG. 10 is a view of the box of FIG. 9 with the door open.
Figure 11:
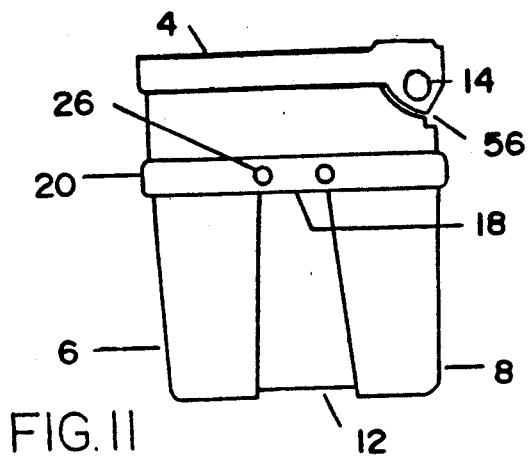
FIG. 11 is a side view of box of FIG. 9 of the invention.

As illustrated by FIGS. 9 and 11 several different box configurations can be produced using the principles of the invention. The figures show a single door general utility box 2. The box 2 comprises a double walled door 4 and a unitarily molded body 6. The body 6 contains end walls 8, sidewalls 10 and a bottom 12. The door 4 is attached to the body 6 through hinges 14. A conventional lock 16 is employed to secure the door 4 to the body 6.

Ribbing 46 is used to strengthen the wall, bottom and top members. The circumferential rib 20 on the end wall provides a handle 18. The box is approximately 20 inches high, 22¼ inches wide and 38 inches long. It is blow molded from high density high molecular weight polyethylene.

The door 4 has a double wall construction. That is, sections of the bottom wall of the door are molded to touch the top wall of the door at intermittent locations. Due to the size of the door, warpage can be a problem. However, warpage can be eliminated by running the recessed sections 22 of the bottom wall parallel to the length of the door 4.

The rim 24 encircling the opening 26 of the body 6 and which supports the door 4 is important in sealing the contents of the box from the outside elements. Water penetration is a serious problem with respect to large blow molded containers. The box is hinged along the back surface 56 of the rim 24. This back surface is at least twice as wide as the front surface 28 of the rim 24. The back surface 56 also is sloped away from the rim 24.

The back surface 56 further contains a cylinder 30 for receiving a metal bar 32 that serves as the box hinge. Open space is provided along cylinder 30 for mating with cylindrical sections 34 of door 4. A spring 36 encircles the metal bar 32 and functions to force the door into an open position. The spring 36 is held in position by groove 38.

The elevated portion 40 of the rim 24 seals against the gasket 42 on the door 4. The design of the rim 24 and the mating of the elevated portion 40 with the gasket 42 renders the box leakproof. The lid is held in the closed position by lock 44.

Conventionally storage boxes are blow molded by quarter inch needles through opening 26. Such a method normally requires approximately 30 seconds for a box this size to exhaust the blowing medium. The present invention utilizes two ports 136 along the end wall 8 for blowing the box. In the mold the end wall which faces down would be punctured by two 1-inch minimum blow pins. These pins allow higher blowing pressures which gives better cooling and product definition. Further, it has been determined the molded part can be exhausted in 5-10 seconds. Due to the cost of the molding process this saving in time is responsible for substantial cost savings. Following molding, the ports 136 are capped to seal the box.

A double lidded box 100 is shown in FIGS. 1-8. This box employs the same principles as the box shown in FIG. 9 with respect to use of blow pins through an end wall 102 and the design of the rims around the door openings. The doors 108 are separated by a center section 110 which is integrally molded with the bottom section 112. The box is approximately 63 inches long, 19¼ inches high and 22 inches wide. The doors are each 23¼ inches wide and the box length is alternatively 53 inches for smaller trucks.

Again the ratio between the width of the back rim surface 116 and the width of the front rim surface is 2 to 1. The back rim surface 116 slopes away from the door opening and the elevated section of the rim mates with the door gaskets. A cylindrical section 122 is provided for a hinge bar 124 which is encircled by spring 126. The spring 126 is held in place by grooves 128. The doors 108 are held in a closed position by locks 130.

For structural strength the box has in ribs 132 and the doors are double walled. A longitudinal rib 134 goes around the upper portion of the bottom section 112. This rib 134 forms handles on the end walls 102. This box also is made from high density high molecular weight polyethylene.

Figure 1:
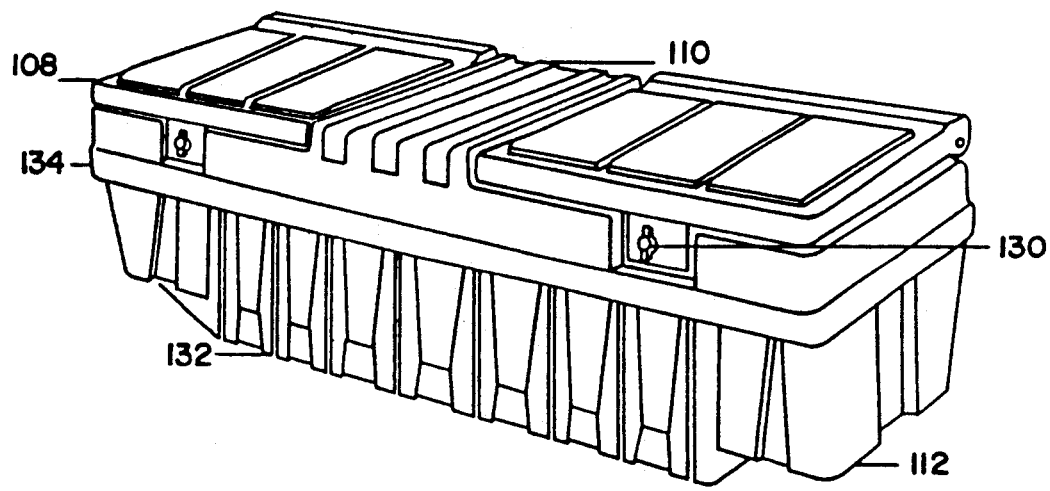
FIG. 1 is a full view of the box of the invention.
Figure 2:
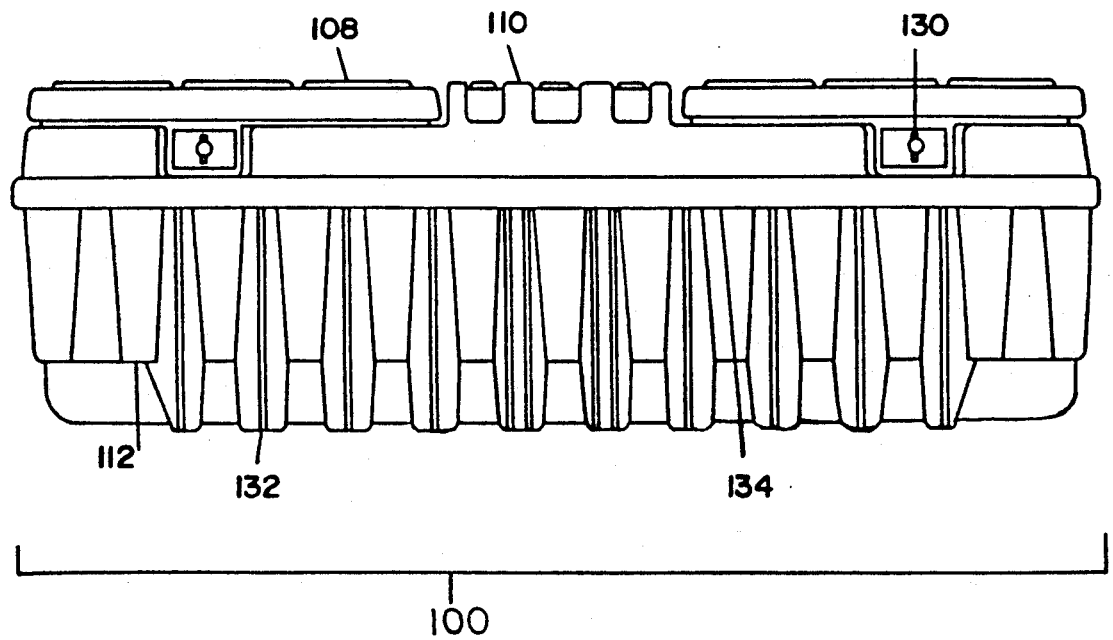
FIG. 2 is a front side view of the box of the invention.
Figure 3:
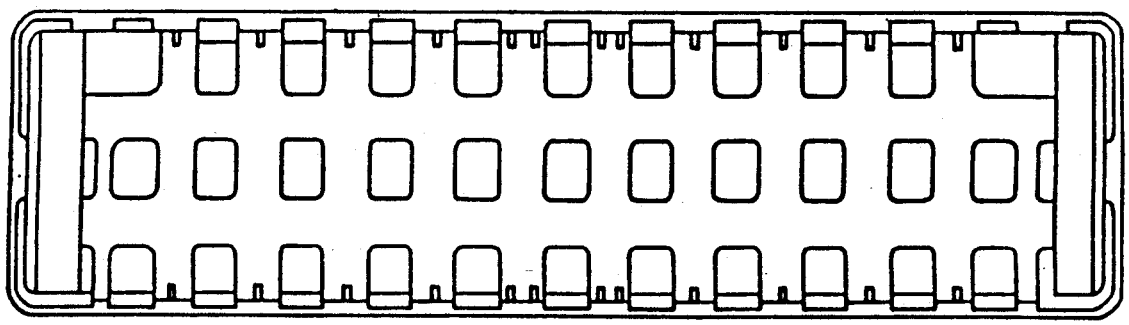
FIG. 3 is a bottom view of the box of the invention.
Figure 4:
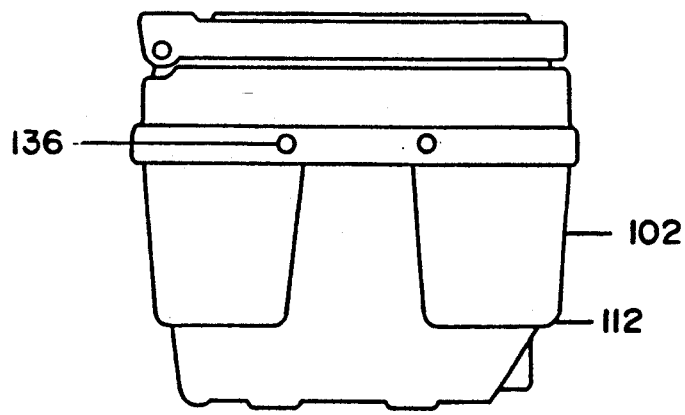
FIG. 4 is a left side view orf the box of the invention.
Figure 5:
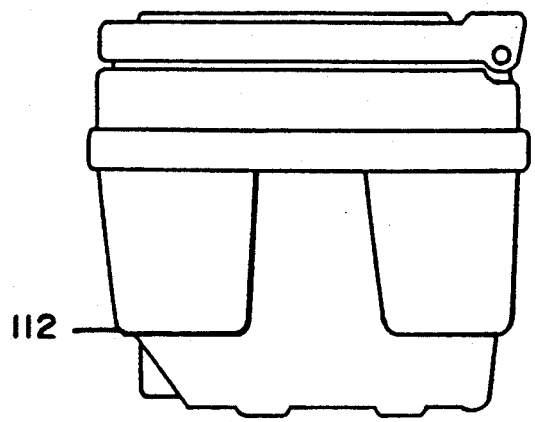
FIG. 5 is a right side view of the box of the invention.
Figure 6:
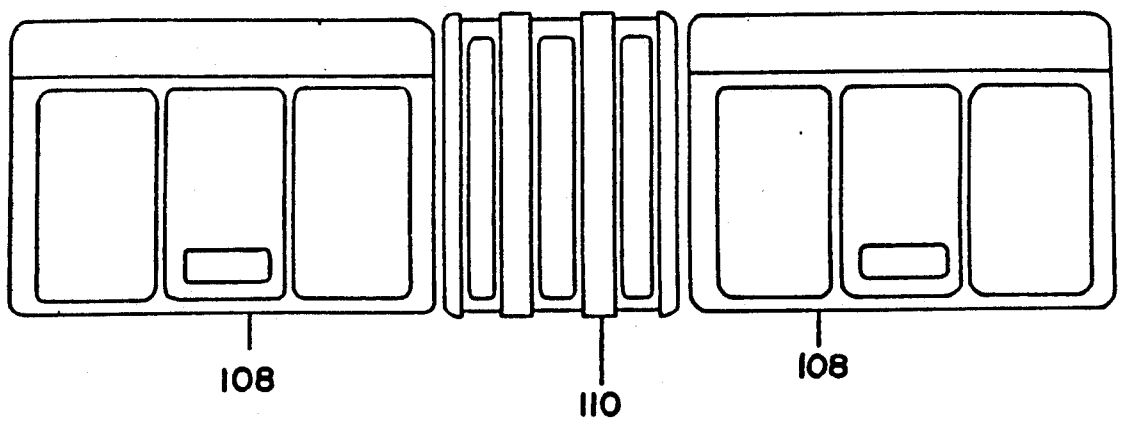
FIG. 6 is a top view of the box of the invention.
Figure 7:
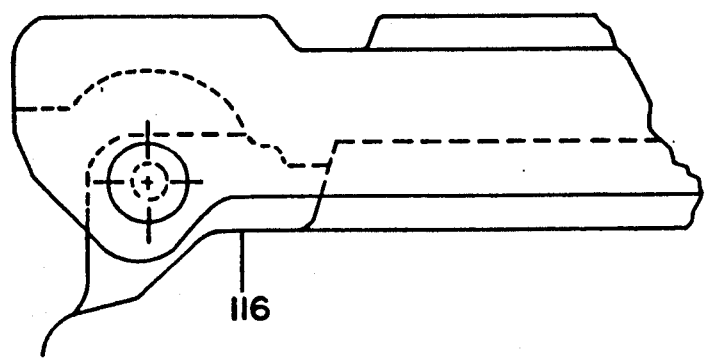
FIG. 7 is a side sectional view showing the lid closed of the invention.
Figure 8:
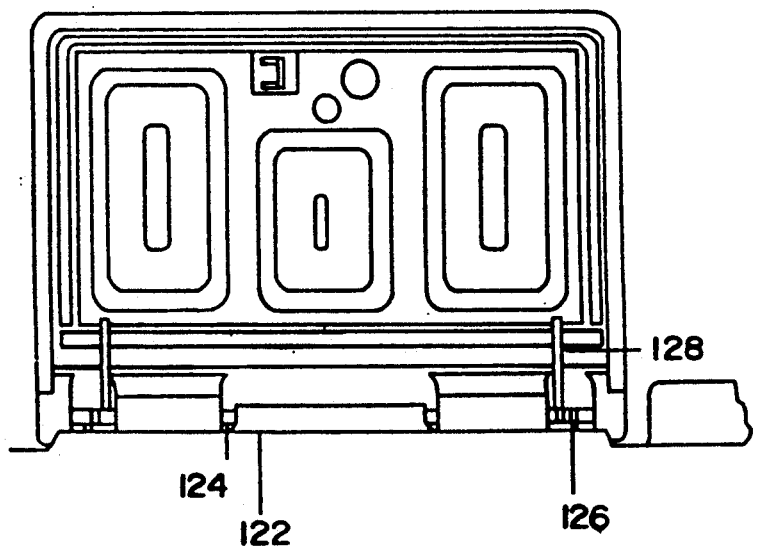
FIG. 8 is a view of the inside of the lid of the invention.

As shown in FIG. 4 one of the end walls 102 contains capped ports 136. These ports provide access for blow pins through the bottom of the mold. All of the previously enumerated advantages are obtained by the use of 1 inch minimum blow pins through ports 136 as opposed to using ⅛ inch needles through openings 26.

The use of blow pins in blow molding large containers, such as fifty five gallon drums, is known in the art. However, such methodology has not been employed in cosmetic type storage boxes due to the holes left in the wall of the box. For instance, in fifty five gallon drums the holes for the blowing pins become the container openings.

We claim:

1. A blow molded storage container comprising end walls and side walls, said end walls and side walls having top surfaces and the container having at least one door opening; a rim around the at least one door opening, the rim having a length and width and extending from the top surfaces of said walls, with the rim on one side wall defining a back section including a door hinge and the rim on another side wall defining a front section, the width of the rim on the back section being at least twice the width of the rim on the front section to prevent water leakage around the door opening, and said back section slopes away from said at least one door opening along substantially the entire width of the rim to further assist in prevention of water penetratiopn into the container; and a door hinged to said back section of the rim, with said door comprising a top wall and a bottom wall.

2. The container according to claim 1, wherein said door has a length, and includes elongated recess members on said bottom wall whose lengths are parallel to the length of the door.

3. The container according to claim 2, wherein the container is at least 20 inches wide and at least 30 inches long.

4. The container according to claim 2, further including a spring located adjacent said back section and said door.

5. The container according to claim 2, further including lock means for locking said door in a closed positioned.

6. The container according to claim 1, wherein the container is at least 20 inches wide and at least 30 inches long.

7. The container according to claim 1, further including a spring located adjacent said back section and said door.

8. The container according to claim 1, further including lock means for locking said door in a closed positioned.

* * * * *